(12) United States Patent
Matsueda et al.

(10) Patent No.: US 7,956,005 B2
(45) Date of Patent: *Jun. 7, 2011

(54) EXHAUST GAS-PURIFYING CATALYST

(75) Inventors: Satoshi Matsueda, Kakegawa (JP);
Mareo Kimura, Kakegawa (JP); Keiichi Narita, Kakegawa (JP)

(73) Assignee: Cataler Corporation, Kakegawa-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/058,654

(22) Filed: Mar. 28, 2008

(65) Prior Publication Data

US 2008/0182746 A1 Jul. 31, 2008

Related U.S. Application Data

(63) Continuation of application No. PCT/JP2006/324460, filed on Dec. 7, 2006.

(30) Foreign Application Priority Data

Dec. 22, 2005 (JP) ................................. 2005-370083

(51) Int. Cl.

| | | |
|---|---|---|
| *B01J 23/00* | (2006.01) | |
| *B01J 23/10* | (2006.01) | |
| *B01J 23/42* | (2006.01) | |
| *B01J 23/44* | (2006.01) | |
| *B01J 23/02* | (2006.01) | |
| *B01J 23/06* | (2006.01) | |
| *B01D 53/56* | (2006.01) | |
| *B01D 53/94* | (2006.01) | |
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |

(52) U.S. Cl. ......... 502/302; 502/303; 502/304; 502/325; 502/339; 502/340; 423/213.5

(58) Field of Classification Search .................. 502/302, 502/303, 304, 325, 328, 332, 333, 334, 339, 502/340, 341, 349, 355; 423/213.5, 593.1–596, 423/598–600

See application file for complete search history.

(56) References Cited

U.S. PATENT DOCUMENTS 4,921,829 A * 5/1990 Ozawa et al. ................. 502/302

(Continued)

FOREIGN PATENT DOCUMENTS

CN 1241988 A 1/2000

(Continued)

OTHER PUBLICATIONS

English translation of the International Preliminary Report on Patentability mailed Jul. 3, 2008, for PCT Application No. PCT/JP2006/324460, six pages.

(Continued)

*Primary Examiner* — Stanley Silverman
*Assistant Examiner* — Anthony J Zimmer
(74) *Attorney, Agent, or Firm* — Morrison & Foerster LLP

(57) ABSTRACT

An object of the present invention is to provide an exhaust gas-purifying catalyst containing a composite oxide catalyst and a refractory support and being less prone to cause a decrease in its activity even when used at high temperatures in an atmosphere with high oxygen concentration. An exhaust gas-purifying catalyst includes a composite oxide catalyst containing rare-earth element, alkaline-earth element and precious metal, a part of the rare-earth element and a part of the alkaline-earth element forming composite oxide, and the composite oxide and a part of the precious metal forming solid solution, and a refractory support supporting the composite oxide catalyst and including at least one of a first composite oxide represented by a general formula $AB_2O_4$, a second composite oxide having perovskite structure represented by a general formula $LMO_3$, and a third composite oxide having pyrochlore structure represented by a general formula $X_2Y_2O_7$.

8 Claims, 2 Drawing Sheets

U.S. PATENT DOCUMENTS

| | | | |
|---|---|---|---|
| 4,965,243 A * | 10/1990 | Yamada et al. | 502/304 |
| 5,597,771 A * | 1/1997 | Hu et al. | 502/304 |
| 6,171,572 B1 | 1/2001 | Aozasa | |
| 6,350,421 B1 * | 2/2002 | Strehlau et al. | 423/213.2 |
| 2005/0215428 A1 * | 9/2005 | Matsueda et al. | 502/328 |
| 2006/0252638 A1 * | 11/2006 | Matsueda et al. | 502/302 |

FOREIGN PATENT DOCUMENTS

| | | |
|---|---|---|
| EP | 0 754 494 A2 | 1/1997 |
| EP | 1 695 761 A1 | 8/2006 |
| JP | 1-168343 A | 7/1989 |
| JP | 4-371229 A | 12/1992 |
| JP | 05-168926 | 7/1993 |
| JP | 06099069 A * | 4/1994 |
| JP | 06-75675 | 9/1994 |
| JP | 10-358 | 1/1998 |
| JP | 2000-169148 | 6/2000 |
| JP | 2001-129399 | 5/2001 |
| JP | 2004290723 A * | 10/2004 |

OTHER PUBLICATIONS

Notification of First Office Action mailed Jun. 29, 2010, for CN Patent Application No. 200680040707.9, with English Translation, 11 pages.

Supplementary European Search Report mailed Dec. 17, 2010, for EP Application No. 06834215.3, six pages.

* cited by examiner

EXHAUST GAS-PURIFYING CATALYST

CROSS REFERENCE TO RELATED APPLICATIONS

This is a Continuation Application of PCT Application No. PCT/JP2006/324460, filed Dec. 7, 2006, which was published under PCT Article 21(2) in Japanese.

This application is based upon and claims the benefit of priority from prior Japanese Patent Application No. 2005-370083, filed Dec. 22, 2005, the entire contents of which are incorporated herein by reference.

BACKGROUND OF THE INVENTION

1. Field of the Invention

The present invention relates to an exhaust gas-purifying catalyst.

2. Description of the Related Art

As an exhaust gas-purifying catalyst that treats exhaust gas of an automobile, a three-way catalyst with precious metal such as platinum supported by an inorganic oxide such as ceria or alumina has been widely used. In the three-way catalyst, the precious metal plays the role in promoting the reduction of nitrogen oxides and the oxidations of carbon monoxide and hydrocarbons. Further, the inorganic oxide plays the roles in increasing the specific surface area of the precious metal and suppressing the sintering of the precious metal by dissipating heat generated by the reactions. In particular, ceria has an oxygen storage capacity and is capable of optimizing the oxidation and reduction reactions.

In recent years, occasions when the automotive vehicle such as automobile is driven at high-speed increase as the performance of an engine increases. Additionally, in order to prevent pollution of the air, the regulations on the exhaust gas are made more stringent. Against these backdrops, temperature of the exhaust gas emitted by the automotive vehicle is on the trend of rising.

Further, the automotive vehicle is required to decrease the carbon dioxide emission in order to suppress the global warming. For these reasons, occasions when the supply of fuel to the engine is cut off in the state that the exhaust gas-purifying catalyst is heated to high temperatures are increasing.

That is, the exhaust gas-purifying catalyst is used at temperatures higher than in the past, and occasions when exposed to an atmosphere excessive in oxygen at high temperatures are increasing. For that, in order to provide the exhaust gas-purifying catalyst that delivers a sufficient performance even when used under such a condition, research and development are actively carried out.

For example, JP-A 5-168926 (KOKAI), JP-A 6-75675 (KOUHYO), and JP-A 2000-169148 (KOKAI) describe improving the heat stability of ceria to suppress the reduction in its oxygen storage capacity and the like. Specifically, JP-A 5-168926 (KOKAI) describes an exhaust gas-purifying catalyst containing an element of platinum group, activated alumina, cerium oxide, barium compound and zirconium compound. JP-A 6-75675 (KOUHYO) describes an exhaust gas-purifying catalyst in which a catalyst-supporting layer contains cerium oxide, zirconium oxide and catalytic metal, and at least parts of cerium oxide and zirconium oxide are present as a composite oxide or a solid solution. JP-A 2000-169148 (KOKAI) describes a cerium-based composite oxide represented as the general formula: $Ce_{1-(a+b)}Zr_aY_bO_{2-b/2}$.

Further, JP-A 10-358 (KOKAI) and JP-A 2001-129399 (KOKAI) describe making platinum present as platinum composite oxide to suppress the sintering of platinum. Specifically, JP-A 10-358 (KOKAI) describes an exhaust gas-purifying catalyst using a high heat-resistant composite oxide that contains platinum and one or more element selected from alkaline-earth metal elements and group IIIA elements. JP-A 2001-129399 (KOKAI) describes an exhaust gas-purifying catalyst that includes a platinum composite oxide layer containing platinum and alkaline-earth metal element on an inorganic oxide support, in which a layer of oxide of metal X, which is at least one element selected from Mg, Ca, Sr, Ba, La and Ce, is interposed therebetween.

However, even if the heat-stability of ceria were improved, the sintering of platinum would occur when the exhaust gas-purifying catalysts are exposed to an atmosphere excessive in oxygen at high temperatures, for example at temperatures from 1,000° C. to 1,200° C., and a sufficient activity would not be achieved. Also, in order to produce platinum composite oxide with a high heat-stability, firing at high temperature is necessary. For this reason, a large majority of exhaust gas-purifying catalysts using platinum composite oxide are small in specific surface area and insufficient in activity.

To solve this challenge, the present inventors have proposed a composite oxide catalyst containing rare-earth element, alkaline-earth element and a precious metal, in which a part of the rare-earth element and a part of the alkaline-earth element form a composite oxide, and this composite oxide and a part of the precious metal form a solid solution. The composite oxide catalyst exhibits an excellent activity even in the case where used at high temperatures in an atmosphere whose oxygen concentration is high. However, in some cases, the activity of the composite oxide catalyst may be lowered when used with a refractory support made of alumina.

BRIEF SUMMARY OF THE INVENTION

An object of the present invention is to provide an exhaust gas-purifying catalyst that contains a composite oxide catalyst and a refractory support and is less prone to cause a decrease in its activity even when used at high temperatures in an atmosphere whose oxygen concentration is high.

According to a first aspect of the present invention, there is provided an exhaust gas-purifying catalyst comprising a composite oxide catalyst containing a rare-earth element, an alkaline-earth element and a precious metal, a part of the rare-earth element and a part of the alkaline-earth element forming a composite oxide, and the composite oxide and a part of the precious metal forming a solid solution, and a refractory support supporting the composite oxide catalyst and including at least one composite oxide selected from the group consisting of a first composite oxide represented by a general formula $AB_2O_4$, a second composite oxide having a perovskite structure represented by a general formula $LMO_3$, and a third composite oxide having a pyrochlore structure represented by a general formula $X_2Y_2O_7$, the element A being alkaline-earth element and/or transition metal element, the element B being at least one element selected from the group consisting of aluminum, magnesium and transition metal elements and differing from the element A, the element L being rare-earth element and/or alkaline-earth element, the element M being aluminum and/or transition metal element, the element X being rare-earth element, and the element Y being zirconium and/or titanium.

According to a second aspect of the present invention, there is provided an exhaust gas-purifying catalyst comprising a composite oxide catalyst containing a rare-earth element, an alkaline-earth element, zirconium and a precious metal, a part of the rare-earth element and a part of zirconium forming a composite oxide with at least a part of the alkaline-earth element, and the composite oxide and a part of the precious metal forming a solid solution, and a refractory support supporting the composite oxide catalyst and including at least one composite oxide selected from the group consisting of a first composite oxide represented by a general formula $AB_2O_4$, a second composite oxide having a perovskite structure represented by a general formula $LMO_3$, and a third composite oxide having a pyrochlore structure represented by a general formula $X_2Y_2O_7$, the element A being alkaline-earth element and/or transition metal element, the element B being at least one element selected from the group consisting of aluminum, magnesium and transition metal elements and differing from the element A, the element L being rare-earth element and/or alkaline-earth element, the element M being aluminum and/or transition metal element, the element X being rare-earth element, and the element Y being zirconium and/or titanium.

DETAILED DESCRIPTION OF THE INVENTION

Embodiments of the present invention will be described below.

Figure 1:
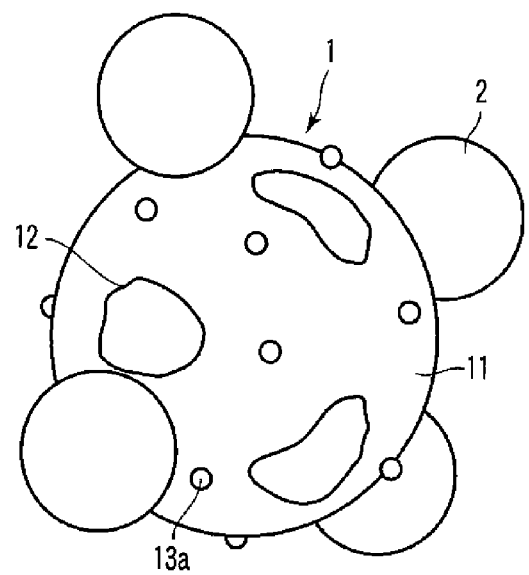
FIG. 1 is a view schematically showing an exhaust gas-purifying catalyst according to a first embodiment of the present invention.

FIG. 1 is a view schematically showing an exhaust gas-purifying catalyst according to a first embodiment of the present invention. The exhaust gas-purifying catalyst is a pellet catalyst formed by agglomerating a mixture of a particulate composite oxide catalyst 1 and a particulate refractory support 2, and a part thereof is shown in FIG. 1.

The composite oxide catalyst 1 includes a support 11, a composite oxide 12 partially covering the surface thereof, and a precious metal 13a supported by the support 11.

The support 11 contains a rare-earth oxide as a main component, while the composite oxide 12 contains a composite oxide of a rare-earth element and an alkaline-earth element as a main component. The rare-earth element forming the composite oxide 12 is the same as the rare-earth element forming the support 11. The composite oxide 12 further contains the same precious metal as the precious metal 13a to form a solid solution.

Here, as an example, it is assumed that the support 11 is made of ceria ($CeO_2$), the composite oxide 12 is made of a composite oxide represented by a chemical formula: $BaCeO_3$, and the precious metal contained in the composite oxide and the precious metal 13a are platinum (Pt). That is, it is assumed that cerium is used as the rare-earth element, barium is used as the alkaline-earth element, and platinum is used as the precious metal. Note that the solid solution of the above composite oxide and platinum can be represented by the chemical formula: $Ba(Ce,Pt)O_3$ and/or $(Ba,Pt)CeO_3$.

The refractory support 2 supports the composite oxide catalyst 1. The refractory support 2 contains at least one of the following first to third composite oxides, and is typically made of at least one of the first to third composite oxides.

The first composite oxide is a composite oxide represented by a general formula: $AB_2O_4$. The element A is alkaline-earth element and/or transition metal element. The element B is at least one element selected from the group consisting of aluminum, magnesium and transition metal elements, and differs from the element A. Although the first composite oxide typically has a spinel structure, it may have other crystal structures such as chrysoberyl structure.

Examples of transition metal element usable for the elements A and B include metal elements having an atomic number from 21 to 30. As the element A, magnesium, strontium or barium can be used, for example. Typically, the element B is aluminum or the major part thereof is aluminum. It is possible that aluminum is used as a part of the element B, and a transition metal element such as iron and/or cobalt is used as another part of the element B.

The second composite oxide is a composite oxide having a perovskite structure represented by a general formula: $LMO_3$. In the general formula, L is rare-earth element and/or alkaline-earth element, and M is aluminum and/or transition metal element.

As the element L, lanthanum or neodymium can be used, for example. Examples of transition metal element usable for the element M include metal element having an atomic number from 21 to 30. Typically, the element M is aluminum or the major part thereof is aluminum. It is possible that aluminum is used as a part of the element M, and a transition metal element such as iron and/or cobalt is used as another part of the element M.

The third composite oxide is a composite oxide having a pyrochlore structure represented by a general formula: $X_2Y_2O_7$. In the general formula, X is rare-earth element, and Y is zirconium and/or titanium. As the element X, neodymium or lanthanum can be used, for example. Typically, the element Y is zirconium or a major part thereof is zirconium.

The exhaust gas-purifying catalyst exhibits a reversible change in state when a composition of an atmosphere is changed under high temperature conditions. This will be described with reference to FIG. 2.

Figure 2:
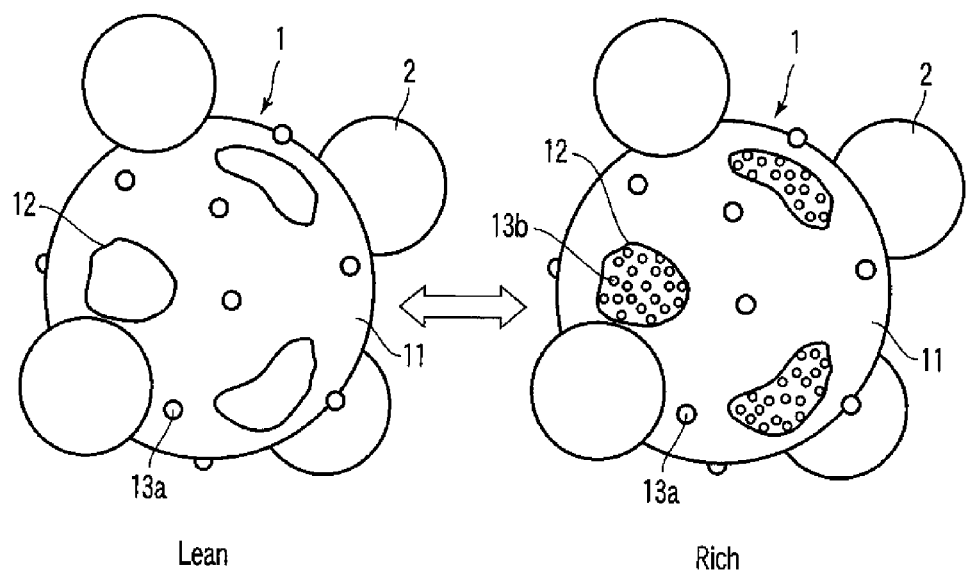
FIG. 2 is a conceptual view schematically showing a state change that the exhaust gas-purifying catalyst shown in FIG. 1 exhibits under high temperature conditions.

FIG. 2 is a conceptual view schematically showing a state change that the exhaust gas-purifying catalyst shown in FIG. 1 exhibits under high temperature conditions. In FIG. 2, the state indicated as "Lean" shows the state that the exhaust gas-purifying catalyst exhibits when exposed to an atmosphere with a high oxygen concentration under high temperature conditions, for example, when the fuel supply to an engine is cut off. The state indicated as "Rich" shows the state that the exhaust gas-purifying catalyst exhibits when exposed to an atmosphere with a low oxygen concentration under high temperature conditions, for example, when an abundance of fuel is continuously supplied to an engine, for example.

The state indicated as "Lean" in FIG. 2 corresponds to the state described with reference to FIG. 1. Here, at least a part of the precious metal 13a may be oxidized; in other words, its oxidation number may be increased.

In this state, the precious metal 13a contributes to the activity of the exhaust gas-purifying catalyst, while platinum in the composite oxide 12 hardly contributes to the activity. However, during the period over which the exhaust gas-purifying catalyst is in the state indicated as "Lean", a concentration of offensive components such as nitrogen oxides, carbon monoxide, hydrocarbons, and the like in the exhaust gas, that is, an offensive component concentration in an atmosphere is relatively low. Thus, the exhaust gas-purifying catalyst delivers a sufficient performance.

When the oxygen concentration in the atmosphere is lowered under high temperature conditions, the exhaust gas-purifying catalyst causes a change from the state indicated as "Lean" to the state indicated as "Rich". Specifically, platinum is precipitated out of the composite oxide 12, and the precipitated platinum forms the precious metals 13b on the surfaces of the composite oxide 12.

During the period over which the exhaust gas-purifying catalyst is in the state indicated as "Rich", the offensive component concentration in the exhaust gas is relatively high. That is, during the period corresponding to the state indicated as "Rich", the exhaust gas-purifying catalyst is required to be higher in activity as compared to the period corresponding to the state indicated as "Lean".

The precious metal 13b is much smaller in size than the precious metal 13a. For example, the size of the precious metal 13a is several nanometers, while the size of the precious metal 13b is equal to or less than about 1 nm. Thus, the exhaust gas-purifying catalyst in the state indicated as "Rich" is higher in activity than the exhaust gas-purifying catalyst in the state indicated as "Lean". Therefore, the exhaust gas-purifying catalyst delivers a sufficient performance even when the offensive component concentration in the exhaust gas is high.

The exhaust gas-purifying catalyst in the state indicated as "Rich" causes a change to the state indicated as "Lean" when the oxygen concentration in the atmosphere increases under high temperature conditions. That is, platinum forming the precious metal 13b and the composite oxides form the solid solution. Note that platinum and ceria hardly form a solid solution.

As described above, the exhaust gas-purifying catalyst causes a reversible change in state. In addition, the exhaust gas-purifying catalyst forms the ultrafine precious metals 13b on the surfaces of the composite oxide 12 every time it causes the change from the state indicated as "Lean" to the state indicated as "Rich". Therefore, this state is recovered by the change from the state indicated as "Rich" to the state indicated as "Lean" and its reverse change. Since an automotive vehicle changes the oxygen concentration in the exhaust gas at relatively close intervals, the exhaust gas-purifying catalyst always exhibits a high activity to deriver a sufficient performance when exposed to a low oxygen concentration atmosphere at high temperatures.

Also, in the exhaust gas-purifying catalyst, the precious metal 13a contributes to the activity of the exhaust gas-purifying catalyst regardless of the composition of the atmosphere and temperature. Therefore, the exhaust gas-purifying catalyst delivers a sufficient performance not only when exposed to a high oxygen concentration atmosphere at high temperatures, but also when used for the first time or used under low temperature conditions.

Further, when the oxygen concentration in the atmosphere is increased under high temperature conditions, the exhaust gas-purifying catalyst makes the precious metal 13b and the composite oxide form the solid solution as described above. Thus, the exhaust gas-purifying catalyst is low in the evaporation loss of platinum in the high oxygen concentration atmosphere.

When alumina is used in the refractory support 2, a reaction between alumina and the composite oxide 12 occurs under high temperature conditions of 1000° C. or higher. For example, a reaction between alumina and the composite oxide 12 produces $BaAl_2O_4$ or produces $BaAl_2O_4$ and $BaCO_3$. When such a decomposition reaction of the composite oxide 12 occurs, the activity of the exhaust gas-purifying catalyst is lowered significantly.

In contrast, the above first to third composite oxides do not react with the composite oxide catalyst 1 even under high temperature conditions of 1,000° C. or higher. Therefore, the exhaust gas-purifying catalyst is less prone to cause a decrease in its activity due to decomposition reaction of the composite oxide 12. That is, the exhaust gas-purifying catalyst according to the present embodiment is less prone to cause a decrease in its activity even when used at high temperatures in an atmosphere whose oxygen concentration is high.

Without willing to be bound by any theory, the reason why alumina reacts with the composite oxide catalyst 1 and the first to third composite oxide do not react with the composite oxide catalyst 1 is thought to be as follows. That is, this is because the first to third composite oxides are highly stable materials in the presence of alkaline-earth element, rare-earth element and transition metal element.

The exhaust gas-purifying catalyst can be manufactured, for example, by the following method.

First, a powdery support 11 containing a rare-earth oxide as a main component is prepared, and is made into slurry. Here, as the dispersion medium, water is used, for example. Then, a solution of precious metal salt is added to the slurry, and the resultant mixture is filtrated. Thereafter, drying and firing of the filter cake are carried out sequentially. In this way, the precious metal is supported by the support 11.

Next, the support 11 supporting the precious metal is added to a solution of alkaline-earth salt. Then, the slurry is heated so as to sufficiently remove liquid. Thus, the alkaline-earth element is supported by the support 11.

The method of making the support 11 support the alkaline-earth element is not limited. For example, a method that the support 11 supporting the precious metal is impregnated with the solution of the alkaline-earth salt, a method utilizing coprecipitation, a method using an alkoxide of alkaline-earth metal, and the like may be used.

Then, the support 11 supporting the precious metal and the alkaline-earth element is fired in an oxidizing atmosphere. Thus, the composite oxide of the rare-earth element and the alkaline-earth element together with the solid solution of the composite oxide and the precious metal are produced so as to obtain the composite oxide catalyst 1.

Note that the firing temperature is set, for example, within the range from about 700° C. to about 1,100° C. When the firing temperature is low, production of the composite oxide is difficult. When the firing temperature is high, the specific surface area of the support 11 is decreased, and therefore, it becomes difficult to satisfactorily distribute the precious metal 13a over the support 11. As a result, a high activity may not be obtained.

Then, the composite oxide catalyst 1 and a powdery refractory support 2 are mixed together. Further, the mixture is subjected to compression-molding, and if necessary, the molded product is crushed. The exhaust gas-purifying catalyst in the form of pellets is obtained by the above method.

Next, the second embodiment of the present invention will be described.

Figure 3:
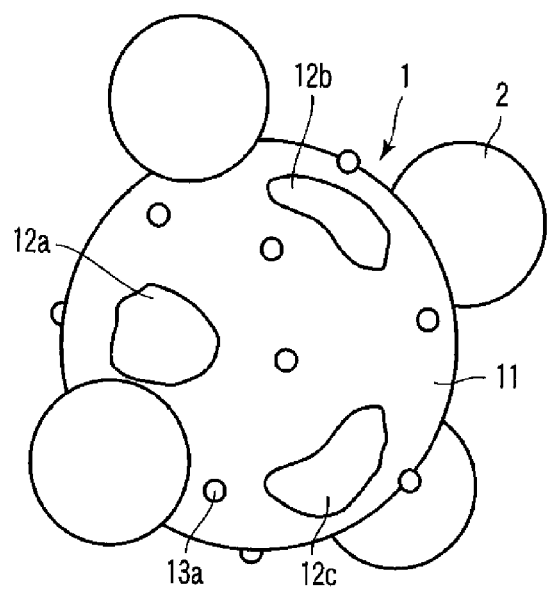
FIG. 3 is a view schematically showing an exhaust gas-purifying catalyst according to a second embodiment of the present invention.

FIG. 3 is a view schematically showing an exhaust gas-purifying catalyst according to a second embodiment of the present invention. The exhaust gas-purifying catalyst is a pellet catalyst formed by agglomerating a mixture of a particulate composite oxide catalyst 1 and a particulate refractory support 2, and a part thereof is shown in FIG. 3.

The exhaust gas-purifying catalyst according to the second embodiment is the same as the exhaust gas-purifying catalyst according to the first embodiment except that the composition of the composite oxide catalyst 1 differs. Therefore, the description concerning the refractory support 2 will be omitted.

In the exhaust gas-purifying catalyst according to the second embodiment, the composite oxide catalyst 1 contains a support 11, composite oxides 12a to 12c partially covering the surface thereof, and a precious metal 13a supported by the support 11.

The support 11 contains a rare-earth oxide as a main component. The support 11 can further contain zirconia ($ZrO_2$), for example. The support 11 may contain a composite oxide of rare-earth element and zirconium as a main component.

The composite oxide 12a contains a composite oxide of rare-earth element and alkaline-earth element as a main component. The composite oxide 12b contains a composite oxide of zirconium and alkaline-earth element as a main component. The composite oxide 12c contains a composite oxide of rare-earth element, zirconium and alkaline-earth element as a main component.

The rare-earth elements contained in the composite oxides 12a to 12c are the same as the rare earth element contained in the support 11, and the composite oxides 12a to 12c contain the same alkaline-earth element. The composite oxides 12a to 12c contain the same precious metal as the precious metal 13a to form solid solutions.

Here, as an example, it is assumed that the support 11 contains ceria as a main component, the composite oxide 12a is made of the composite oxide represented by the chemical formula: $BaCeO_3$, the composite oxide 12b is made of the composite oxide represented by the chemical formula: $BaZrO_3$, and the composite oxide 12c is made of the composite oxide represented by the chemical formula: $Ba(Zr,Ce)O_3$. It is also assumed that the precious metals contained in the composite oxides 12a to 12c and the precious metal 13a are platinum. That is, it is assumed that cerium is used as the rare-earth element, barium is used as the alkaline-earth element, and platinum is used as the precious metal. Note that the solid solution of the composite oxide 12a and platinum can be represented by the chemical formula: $Ba(Ce,Pt)O_3$, the solid solution of the composite oxide 12b and platinum can be represented by the chemical formula: $Ba(Zr,Pt)O_3$, and the solid solution of the composite oxide 12c and platinum can be represented by the chemical formula: $Ba(Zr, Ce, Pt)O_3$.

The exhaust gas-purifying catalyst exhibits a reversible change in state similar to the exhaust gas-purifying catalyst according to the first embodiment when a composition of an atmosphere is changed under high temperature conditions. In addition, the composite oxide catalyst 1 contained in the exhaust gas-purifying catalyst and the above described first to third composite oxides do not react together even under high temperature conditions of 1,000° C. or higher. That is, similar to the exhaust gas-purifying catalyst according to the first embodiment, the exhaust gas-purifying catalyst according to the present embodiment is less prone to cause a decrease in its activity even when used at high temperatures in an atmosphere whose oxygen concentration is high.

The exhaust gas-purifying catalyst can be manufactured, for example, by the following method.

First, a powdery support 11 containing a composite oxide of rare-earth element and zirconia as a main component is prepared, and is made into slurry. Here, as the dispersion medium, water is used, for example. Then, a solution of precious metal salt is added to the slurry, and the resultant mixture is filtrated. Thereafter, drying and firing of the filter cake are carried out sequentially. In this way, the precious metal is supported by the support 11.

Next, the support 11 supporting the precious metal is added to a solution of alkaline-earth salt. Then, the slurry is heated so as to sufficiently remove liquid. Thus, the alkaline-earth element is supported by the support 11.

The method of making the support 11 support the alkaline-earth element is not limited. For example, a method that the support 11 supporting the precious metal is impregnated with the solution of the alkaline-earth salt, a method utilizing coprecipitation, a method using an alkoxide of alkaline-earth metal, and the like may be used.

Then, the support 11 supporting the precious metal and the alkaline-earth element is fired in an oxidizing atmosphere. Thus, the composite oxides 12a to 12c and the solid solutions of the composite oxides 12a to 12c and the precious metal are produced so as to obtain the composite oxide catalyst 1.

Note that the firing temperature is set, for example, within a range from about 700° to about 1,000° C. When the firing temperature is low, productions of the composite oxides 12a to 12c and the solid solutions of the composite oxides 12a to 12c and the precious metal are difficult. When the firing temperature is high, the specific surface area of the support 11 decreases, and therefore, it becomes difficult to satisfactorily distribute the precious metal 13a over the support 11. As a result, a high activity may not be obtained.

Then, the composite oxide catalyst 1 and a powdery refractory support 2 are mixed together. Further, the mixture is subjected to compression-molding, and if necessary, the molded product is crushed. The exhaust gas-purifying catalyst in the form of pellets is obtained by the above method.

In the exhaust gas-purifying catalyst according to the first and second embodiment, the content of the composite oxide catalyst 1 is set, for example, within the range from 1% to 99% by weight.

The ratio of the precious metal forming the solid solution with respect the whole precious metal supported by the composite oxide catalyst 1, which is referred to as a solid solution-forming ratio hereinafter, is set, for example, within a range from 10% to 80%. When the solid solution-forming ratio is small, the effect of suppressing the decrease in activity due to the sintering of precious metal may be insufficient. When the solid solution-forming ratio is large, the initial activity may be insufficient.

Although in the first and second embodiments, the case where cerium is used as the rare-earth element is described as an example, another element may be used as the rare-earth element. For example, lanthanum, praseodymium, neodymium and the like may be used. Alternatively, plural rare-earth elements may be used.

Although in the first and second embodiments, barium is used as the alkaline-earth element of the composite oxide catalyst 1, an element other than barium may be used as the alkaline-earth element. For example, strontium, calcium, magnesium and the like may be used. Alternatively, plural alkaline-earth elements may be used.

In the exhaust gas-purifying catalyst according to the first embodiment, the atomic ratio of alkaline-earth element with respect to the rare-earth element in the composite oxide catalyst 1 is set, for example, within a range from 1 atomic % to 80 atomic %, and typically within a range from 10 atomic % to 50 atomic %. In the case where the atomic ratio of alkaline-earth element with respect to the rare-earth element is small, the volume ratio of the composite oxide 12 with respect to the support 11 is small. Thus, the recovery in performance of the composite oxide catalyst 1 caused by the composition fluctuation of the atmosphere may be insufficient. In the case where the atomic ratio of alkaline-earth element with respect to the rare-earth element is excessively large, oxidation, i.e., increase in oxidation number may become difficult to occur when the oxygen concentration in atmosphere is increased at high temperatures. Thus, it may become difficult to produce the solid solution of the precious metal and the composite oxide when the concentration of oxygen in atmosphere is increased at high temperatures, and as a result, the sintering of precious metal may be prone to occur.

In the exhaust gas-purifying catalyst according to the second embodiment, the atomic ratio of alkaline-earth element with respect to the sum of rare-earth element and zirconium in the composite oxide catalyst 1 is set, for example, equal to or higher than 0.1 atomic % and lower than 10 atomic %, and typically within a range from 0.3 atomic % to 5 atomic % in the case where used under high temperature conditions of equal to or higher than 700° C. and lower than 1000° C. The ratio is set, for example, 10 atomic % or higher, and typically 20 atomic % or higher in the case where used under high temperature conditions of 1,000° C. or higher. Also in this case, the above ratio is set, for example, 100 atomic % or lower, and typically 80 atomic % or lower. In the case where the atomic ratio is small, the volume ratio of the composite oxide 12 with respect to the support 11 is small. Thus, the recovery in performance of the composite oxide catalyst 1 caused by the composition fluctuation of the atmosphere may be insufficient. In the case where the atomic ratio is excessively large, the ratio of precious metal 13a with respect to whole precious metal supported by the composite oxide catalyst 1 is small. Thus, a sufficient catalytic activity may not be achieved under high-temperature and high-oxygen concentration conditions. In addition, when the atomic ratio is raised excessively, the heat resistance performance of the support 11 may be decreased under high-temperature conditions, and as a result, the sintering of precious metal may be prone to occur.

Although platinum is used as the precious metal in the first and second embodiments, an element other than platinum may be used as the precious metal. For example, platinum group elements such as palladium and rhodium may be used. Alternatively, plural precious metals may be used.

The precious metal content of the composite oxide catalyst 1 is set, for example, within a range from 0.01% to 10% by weight, and typically within a range from 0.1% to 5% by weight. When the precious metal content is small, a sufficient catalytic activity may not be achieved. When the precious metal content is large, the sintering of precious metal may be prone to occur.

Although the case where the exhaust gas-purifying catalyst is a pellet catalyst is described as an example, the exhaust gas-purifying catalyst may take various forms. For example, the exhaust gas-purifying catalyst may be a monolith catalyst.

Examples of the present invention will be described below.

Example 1

Preparation of Composite Oxide Catalyst A

Cerium nitrate [Ce(NO$_3$)$_3$] and zirconium oxynitrate [ZrO(NO$_3$)$_2$] were weighed such that the atomic ratio of cerium to zirconium was 1:1 and were added to 500 mL of deionized water. After stirring sufficiently, an aqueous solution containing 10% by weight of ammonium hydroxide was dropped into the aqueous solution at room temperature to cause coprecipitation. The aqueous solution containing the coprecipitate was stirred for 60 minutes and then filtrated.

The filter cake was sufficiently washed with deionized water and dried at 110° C. The dried material was subjected to a calcination at 500° C. for 3 hours in the atmosphere. The calcined material was crushed by using a mortar and fired at 800° C. for 5 hours in the atmosphere.

The measurement of diffraction spectrum utilizing an X-ray diffractometer was carried out on the powder thus obtained. As a result, it was proved that the powder was made of an oxide represented by a chemical formula: (Ce,Zr)O$_2$. Note that the specific surface area of the powder was 90 m$^2$/g.

Next, 50 g of the oxide powder was weighed and added into 500 mL of deionized water. After the oxide powder was well dispersed in the deionized water by 10 minutes of ultrasonic agitation, a solution of dinitrodiamine platinum nitrate was added to the slurry. The concentration and amount of the dinitrodiamine platinum nitrate solution were adjusted such that the platinum content in the composite oxide catalyst to be prepared would be 1% by weight.

After that, the slurry was filtrated under suction. The filtrate was subjected to inductively coupled plasma (ICP) spectrometry. As a result, it was revealed that the filter cake contained almost the entire platinum in the slurry.

Next, the filter cake was dried at 110° C. for 12 hours. Then, it was calcined at 500° C. in the atmosphere. Thus, platinum was supported by the oxide.

Subsequently, barium acetate was dissolved into 100 mL of deionized water. Then, 50 g of the oxide supporting platinum was weighed and added into the barium acetate solution. Note that the concentration of the barium acetate solution was adjusted such that the atomic ratio of barium with respect to the sum of cerium and zirconium in the composite oxide catalyst to be prepared would be 20.0 atomic %.

Then, the slurry was heated so as to remove the excess water. Next, it was fired at 1,000° C. for 3 hours in the atmosphere. Thus, a composite oxide containing barium and a solid solution of the composite oxide and platinum were produced. Hereinafter, the powder thus obtained is referred to as a composite oxide catalyst A.

The measurement of diffraction spectrum utilizing an X-ray diffractometer was carried out on the composite oxide catalyst A. As a result, it was proved that the composite oxide catalyst A contained a composite oxide represented by the chemical formula: BaZrO$_3$ and a composite oxide represented by the chemical formula: Ba(Ce,Zr)O$_3$.

A part of the composite oxide catalyst A was taken and immersed for 12 hours in a 10% aqueous hydrogen fluoride held at room temperature. Note that this condition allowed only the barium-containing composite oxide of the above powder to be dissolved. Subsequently, the solution was filtrated, and the filtrate was subjected to ICP spectrometry. As a result, the platinum content of the filtrate revealed that 45% of platinum formed the solid solution, in other words, the solid solution-forming ratio was 45%.

<Preparation of Refractory Support A>

Magnesium acetate [Mg(CH$_3$COO)$_2$.4H$_2$O] and aluminum nitrate [Al(NO$_3$)$_3$.9H$_2$O] were weighed such that the atomic ratio of magnesium to aluminum was 1:2 and were added to deionized water. Here, 107.2 g of magnesium acetate and 375.1 g of aluminum nitrate were added to 2,000 mL of deionized water.

After stirring sufficiently, an aqueous solution containing ammonium hydroxide was dropped into the aqueous solution at room temperature to cause coprecipitation. The aqueous solution containing the coprecipitate was stirred sufficiently and then filtrated. Note that the aqueous solution containing ammonium hydroxide was prepared by dissolving 70 g of ammonia into 1,000 mL of deionized water.

The filter cake was sufficiently washed with deionized water and dried at 110° C. The dried material was subjected to a calcination at 600° C. for 3 hours in the atmosphere. The calcined material was crushed by using a mortar and fired at 1,000° C. for 5 hours in the atmosphere. Hereinafter, the powder thus obtained is referred to as a refractory support A.

The measurement of diffraction spectrum utilizing an X-ray diffractometer was carried out on the refractory support A. As a result, it was proved that the refractory support A was a spinel represented by a chemical formula: $MgAl_2O_4$. Note that the specific surface area of the refractory support A was 38 $m^2/g$.

<Preparation of Exhaust Gas-Purifying Catalyst AA>

10 g of the composite oxide catalyst A and 10 g of the refractory support A were evenly mixed by using a mortar. Next, the mixture was compression-molded. Further, the molded product was crushed so as to obtain an exhaust gas-purifying catalyst in the form of pellets with a particle diameter of about 0.5 mm to about 1.0 mm. Hereinafter, the exhaust gas-purifying catalyst is referred to as an exhaust gas-purifying catalyst AA.

Example 2

Preparation of Composite Oxide Catalyst B

Barium acetate and calcium acetate were dissolved into 100 mL of deionized water. A composite oxide catalyst powder was prepared by the same method as described for the composite oxide catalyst A except that this aqueous solution was used instead of the aqueous solution of barium acetate. Note that concentrations of barium and calcium in the aqueous solution were adjusted such that each of the atomic ratios of barium and calcium with respect to the sum of cerium and zirconium was 10.0 atomic %. Hereinafter, the powder thus obtained is referred to as a composite oxide catalyst B.

The measurement of diffraction spectrum utilizing an X-ray diffractometer was carried out on the composite oxide catalyst B. As a result, it was proved that the composite oxide catalyst B contained a composite oxide represented by the chemical formula: $BaZrO_3$, a composite oxide represented by the chemical formula: $Ba(Ce,Zr)O_3$, and a composite oxide represented by the chemical formula: $CaZrO_3$.

The solid solution-forming ratio of platinum was determined on the composite oxide catalyst B by the same method as described for the composite oxide A. As a result, the solid solution-forming ratio of platinum in the composite oxide catalyst B was 38%.

<Preparation of Exhaust Gas-Purifying Catalyst BA>

An exhaust gas-purifying catalyst in the form of pellets was prepared by the same method as described for the exhaust gas-purifying catalyst AA except that the composite oxide catalyst B was used instead of the composite oxide catalyst A. Hereinafter, the exhaust gas-purifying catalyst is referred to as an exhaust gas-purifying catalyst BA.

Example 3

Preparation of Composite Oxide Catalyst C

Calcium acetate was dissolved into 100 mL of deionized water. A composite oxide catalyst powder was prepared by the same method as described for the composite oxide catalyst A except that this aqueous solution was used instead of the aqueous solution of barium acetate. Note that concentration of calcium in the aqueous solution was adjusted such that the atomic ratio of calcium with respect to the sum of cerium and zirconium was 20.0 atomic %. Hereinafter, the powder thus obtained is referred to as a composite oxide catalyst C.

The measurement of diffraction spectrum utilizing an X-ray diffractometer was carried out on the composite oxide catalyst C. As a result, it was proved that the composite oxide catalyst C contained a composite oxide represented by the chemical formula: $CaZrO_3$.

The solid solution-forming ratio of platinum was determined on the composite oxide catalyst C by the same method as described for the composite oxide A. As a result, the solid solution-forming ratio of platinum in the composite oxide catalyst C was 25%.

<Preparation of Exhaust Gas-Purifying Catalyst CA>

An exhaust gas-purifying catalyst in the form of pellets was prepared by the same method as described for the exhaust gas-purifying catalyst AA except that the composite oxide catalyst C was used instead of the composite oxide catalyst A. Hereinafter, the exhaust gas-purifying catalyst is referred to as an exhaust gas-purifying catalyst CA.

Example 4

Preparation of Refractory Support B

Lanthanum nitrate $[La(NO_3)_3.6H_2O]$ and aluminum nitrate $[Al(NO_3)_3.9H_2O]$ were weighed such that the atomic ratio of lanthanum to aluminum was 1:1 and were added to deionized water. Here, 145 g of lanthanum nitrate and 125 g of aluminum nitrate were added to 1,500 mL of deionized water.

After stirring sufficiently, an aqueous solution containing ammonium hydroxide was dropped into the aqueous solution at room temperature to cause coprecipitation. The aqueous solution containing the coprecipitate was stirred sufficiently and then filtrated. Note that the aqueous solution containing ammonium hydroxide was dropped such that 2 mol of ammonia was loaded.

The filter cake was sufficiently washed with deionized water and dried at 110° C. The dried material was subjected to a calcination at 600° C. for 3 hours in the atmosphere. The calcined material was crushed by using a mortar and fired at 800° C. for 5 hours in the atmosphere. Hereinafter, the powder thus obtained is referred to as a refractory support B.

The measurement of diffraction spectrum utilizing an X-ray diffractometer was carried out on the refractory support B. As a result, it was proved that the refractory support B had a perovskite structure represented by a chemical formula: $LaAlO_3$. Note that the specific surface area of the refractory support B was 60 $m^2/g$.

<Preparation of Exhaust Gas-Purifying Catalyst AB>

An exhaust gas-purifying catalyst in the form of pellets was prepared by the same method as described for the exhaust gas-purifying catalyst AA except that the refractory support B was used instead of the refractory support A. Hereinafter, the exhaust gas-purifying catalyst is referred to as an exhaust gas-purifying catalyst AB.

Example 5

Preparation of Refractory Support C

Neodymium nitrate $[Nd(NO_3)_3.6H_2O]$ and zirconium oxynitrate $[ZrO(NO_3)_2.2H_2O]$ were weighed such that the atomic ratio of neodymium to zirconium was 1:1 and were added to deionized water. Here, 109.5 g of neodymium nitrate and 66.8 g of zirconium oxynitrate were added to 1,000 mL of deionized water.

After stirring sufficiently, an aqueous solution containing ammonium hydroxide was dropped into the aqueous solution at room temperature to cause coprecipitation. The aqueous solution containing the coprecipitate was stirred sufficiently and then filtrated. Note that the aqueous solution containing ammonium hydroxide was dropped such that 3.5 mol of ammonia was loaded.

The filter cake was sufficiently washed with deionized water and dried at 110° C. The dried material was subjected to a calcination at 600° C. for 3 hours in the atmosphere. The calcined material was crushed by using a mortar and fired at 900° C. for 5 hours in the atmosphere. Hereinafter, the powder thus obtained is referred to as a refractory support C.

The measurement of diffraction spectrum utilizing an X-ray diffractometer was carried out on the refractory support C. As a result, it was proved that the refractory support C had a pyrochlore structure represented by a chemical formula: $Nd_2Zr_2O_7$. Note that the specific surface area of the refractory support C was 45 m²/g.

<Preparation of Exhaust Gas-Purifying Catalyst AC>

An exhaust gas-purifying catalyst in the form of pellets was prepared by the same method as described for the exhaust gas-purifying catalyst AA except that the refractory support C was used instead of the refractory support A. Hereinafter, the exhaust gas-purifying catalyst is referred to as an exhaust gas-purifying catalyst AC.

COMPARATIVE EXAMPLE

Preparation of Exhaust Gas-Purifying Catalyst AD

An exhaust gas-purifying catalyst in the form of pellets was prepared by the same method as described for the exhaust gas-purifying catalyst AA except that a commercially available alumina with the specific surface area of 90 m²/g was used as a refractory support D instead of the refractory support A. Hereinafter, the exhaust gas-purifying catalyst is referred to as an exhaust gas-purifying catalyst AD.

Next, the endurance of these exhaust gas-purifying catalysts was tested by the following method.

First, each exhaust gas-purifying catalyst was set in a flow-type endurance test apparatus, and a gas containing nitrogen as a main component was made to flow through the catalyst bed at a flow rate of 1000 mL/minute for 30 hours. The temperature of the catalyst bed was held at 1050° C. As the gas made to flow through the catalyst bed, a lean gas prepared by adding oxygen to nitrogen at a concentration of 5% and a rich gas prepared by adding carbon monoxide to nitrogen at a concentration of 10% were used, and these gases were switched at intervals of 5 minutes.

Next, each exhaust gas-purifying catalyst was set in an atmospheric fixed bed flow reactor. Then, the temperature of the catalyst bed was raised from 100° to 500° C. at the temperature increase rate of 12° C./minute and the exhaust gas-purifying ratio was continuously measured while a model gas was made to flow through the catalyst bed. As the model gas, the gas containing equivalent amounts of oxidizing components (oxygen and nitrogen oxides) and reducing components (carbon monoxide, hydrocarbons and hydrogen), which were adjusted stoichiometrically, was used. The results were shown in the table below.

TABLE 1

| Exhaust gas-purifying catalyst | Composition of composite oxide catalyst | | | | | Composition of refractory support | 50% purifying temprature (° C.) | |
|---|---|---|---|---|---|---|---|---|
| | Ce (at %) | Zr (at %) | Ba (at %) | Ca (at %) | Pt (wt %) | | HC | NO$_x$ |
| AA | 50 | 50 | 20 | 0 | 1 | MgAl$_2$O$_4$ | 310 | 326 |
| BA | 50 | 50 | 10 | 10 | 1 | MgAl$_2$O$_4$ | 315 | 330 |
| CA | 50 | 50 | 0 | 20 | 1 | MgAl$_2$O$_4$ | 325 | 345 |
| AB | 50 | 50 | 20 | 0 | 1 | LaAlO$_3$ | 316 | 330 |
| AC | 50 | 50 | 20 | 0 | 1 | Nd$_2$ZrO$_7$ | 322 | 335 |
| AD | 50 | 50 | 20 | 0 | 1 | Al$_2$O$_3$ | 405 | 440 |

In the above table, the columns denoted by "Ba", "Ce", "Zr" and "Ca" show the atomic ratios of barium, cerium, zirconium and calcium with respect to metal elements other than platinum contained in the composite oxide catalyst, respectively. The column denoted by "Pt" shows the weight ratio of platinum with respect to the composite oxide catalyst. The column denoted by "50% purifying temperature" shows the lowest temperature of the catalyst bed at which 50% or more of each component contained in the model gas was purified, and the columns denoted by "HC" and "NO$_x$" show the data for hydrocarbons and nitrogen oxides, respectively.

As shown in the table, the exhaust gas-purifying catalysts AA, BA, CA, AB and AC could purify the model gas at lower temperatures as compared to the exhaust gas-purifying catalyst AD. This result revealed that the exhaust gas-purifying catalysts AA, BA, CA, AB and AC were excellent in endurance as compared to the exhaust gas-purifying catalyst AD.

Next, the measurements of diffraction spectrum utilizing the X-ray diffractometer were carried out on the exhaust gas-purifying catalysts AA and AD after the endurance test. The results are shown in FIG. 4.

Figure 4:
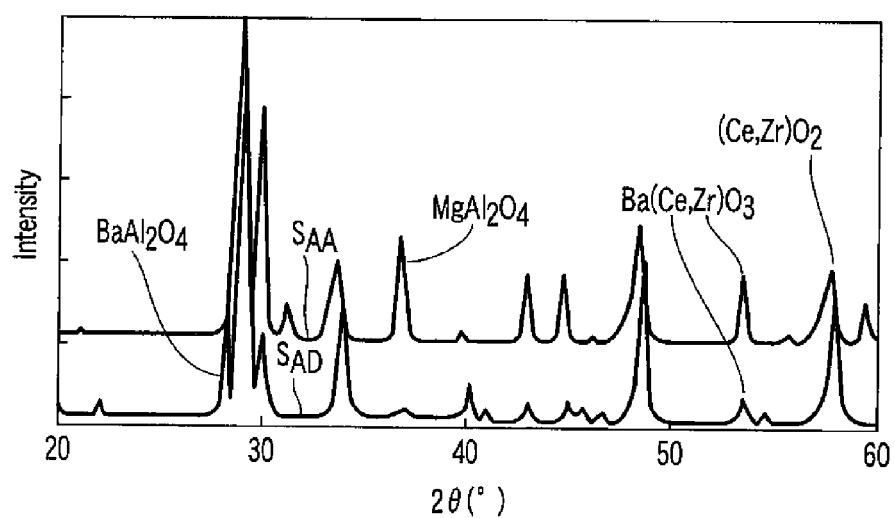
FIG. 4 is a graph showing X-ray diffraction spectra of exhaust gas-purifying catalysts obtained after an endurance test.

FIG. 4 is a graph showing X-ray diffraction spectra of exhaust gas-purifying catalysts obtained after an endurance test. In the figure, the abscissa denotes the diffraction angle, while the ordinate denotes the detected intensity. Also, in the figure, the curve $S_{AA}$ represents the X-ray diffraction spectrum obtained on the exhaust gas-purifying catalyst AA after the endurance test, and the curve $S_{AD}$ represents the X-ray diffraction spectrum obtained on the exhaust gas-purifying catalyst AD after the endurance test.

The spectrum $S_{AA}$ does not includes the peak originated from the composite oxide represented by the chemical formula: $BaAl_2O_4$. In contrast, the spectrum $S_{AD}$ includes the peak originated from the composite oxide represented by the chemical formula: $BaAl_2O_4$. Although not shown in the figure, both spectra obtained on the exhaust gas-purifying catalysts AA and AD before the endurance test do not includes the peak originated from the composite oxide represented by the chemical formula: $BaAl_2O_4$.

As apparent from this, the decomposition of the composite oxide catalyst A occurred in the exhaust gas-purifying catalyst AD by the endurance test so as to produce the composite oxide represented by the chemical formula: $BaAl_2O_4$ as a decomposition product. In contrast, in the exhaust gas-purifying catalyst AA, no decomposition of the composite oxide catalyst A was occurred by the endurance test.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas-purifying catalyst comprising:
a particulate composite oxide catalyst containing a rare-earth element, an alkaline-earth element and a precious metal, a part of the rare-earth element and a part of the alkaline-earth element forming a composite oxide, and the composite oxide and a part of the precious metal forming a solid solution; and
a particulate refractory support supporting the particulate composite oxide catalyst and including at least one composite oxide selected from the group consisting of a first composite oxide represented by a general formula $AB_2O_4$, and a second composite oxide having a pyrochlore structure represented by a general formula $X_2Y_2O_7$, the element A being alkaline-earth element and/or transition metal element, the element B being at least one element selected from the group consisting of aluminum, magnesium and transition metal elements and differing from the element A, the element X being rare-earth element, the element Y being zirconium and/or titanium, and the particulate composite oxide catalyst and the particulate refractory support forming a mixture wherein a ratio of the precious metal forming the solid solution with respect to the whole precious metal falls within a range from 10% to 80%.

2. An exhaust gas-purifying catalyst comprising:
a particulate composite oxide catalyst containing a rare-earth element, an alkaline-earth element, zirconium and a precious metal, a part of the rare-earth element and a part of zirconium forming a composite oxide with at least a part of the alkaline-earth element, and the composite oxide and a part of the precious metal forming a solid solution; and
a particulate refractory support supporting the particulate composite oxide catalyst and including at least one composite oxide selected from the group consisting of a first composite oxide represented by a general formula $AB_2O_4$, and a second composite oxide having a pyrochlore structure represented by a general formula $X_2Y_2O_7$, the element A being alkaline-earth element and/or transition metal element, the element B being at least one element selected from the group consisting of aluminum, magnesium and transition metal elements and differing from the element A, the element X being rare-earth element, the element Y being zirconium and/or titanium, and the particulate composite oxide catalyst and the particulate refractory support forming a mixture wherein a ratio of the precious metal forming the solid solution with respect to the whole precious metal falls within a range from 10% to 80%.

3. The exhaust gas-purifying catalyst according to claim 1 or 2, wherein the refractory support includes the first composite oxide, the first composite oxide has a spinel structure, and the element B includes aluminum.

4. The exhaust gas-purifying catalyst according to claim 1 or 2, wherein the refractory support includes the second composite oxide, and the element Y includes zirconium.

5. The exhaust gas-purifying catalyst according to claim 1, wherein the exhaust gas-purifying catalyst is a pellet catalyst.

6. The exhaust gas-purifying catalyst according to claim 1, wherein the exhaust gas-purifying catalyst is a monolith catalyst.

7. The exhaust gas-purifying catalyst according to claim 2, wherein the exhaust gas-purifying catalyst is a pellet catalyst.

8. The exhaust gas-purifying catalyst according to claim 2, wherein the exhaust gas-purifying catalyst is a monolith catalyst.

* * * * *